United States Patent

(12) United States Patent
Ryan et al.

(10) Patent No.: US 11,061,473 B2
(45) Date of Patent: Jul. 13, 2021

(54) UPDATING A CORNEA MODEL

(71) Applicant: Tobii AB, Danderyd (SE)

(72) Inventors: Mark Ryan, Danderyd (SE); Jonas Sjöstrand, Danderyd (SE); Erik Lindén, Danderyd (SE); Pravin Rana, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/834,485

(22) Filed: Mar. 30, 2020

(65) Prior Publication Data

US 2021/0011549 A1   Jan. 14, 2021

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0075* (2013.01); *G02B 27/0093* (2013.01); *G02B 27/0101* (2013.01); *G02B 27/0172* (2013.01); *G02B 2027/0127* (2013.01); *G02B 2027/0138* (2013.01)

(58) Field of Classification Search
None
See application file for complete search history.

(56) References Cited

U.S. PATENT DOCUMENTS

| 2014/0146148 | A1* | 5/2014 | Maciocci | G06F 3/013 348/59 |
| 2014/0211995 | A1* | 7/2014 | Model | G06F 3/013 382/103 |
| 2018/0081434 | A1* | 3/2018 | Siddiqui | G06F 3/013 |

* cited by examiner

*Primary Examiner* — Duane N Taylor, Jr.
(74) *Attorney, Agent, or Firm* — Samuel I. Yamron

(57) ABSTRACT

A method of updating a cornea model for a cornea of an eye is disclosed, as well as a corresponding system and storage medium. The method comprises controlling a display to display a stimulus at a first depth, wherein the display is capable of displaying objects at different depths, receiving first sensor data obtained by an eye tracking sensor while the stimulus is displayed at the first depth by the display, controlling the display to display a stimulus at a second depth, wherein the second depth is different than the first depth, receiving second sensor data obtained by the eye tracking sensor while the stimulus is displayed at the second depth by the display, and updating the cornea model based on the first sensor data and the second sensor data.

18 Claims, 7 Drawing Sheets

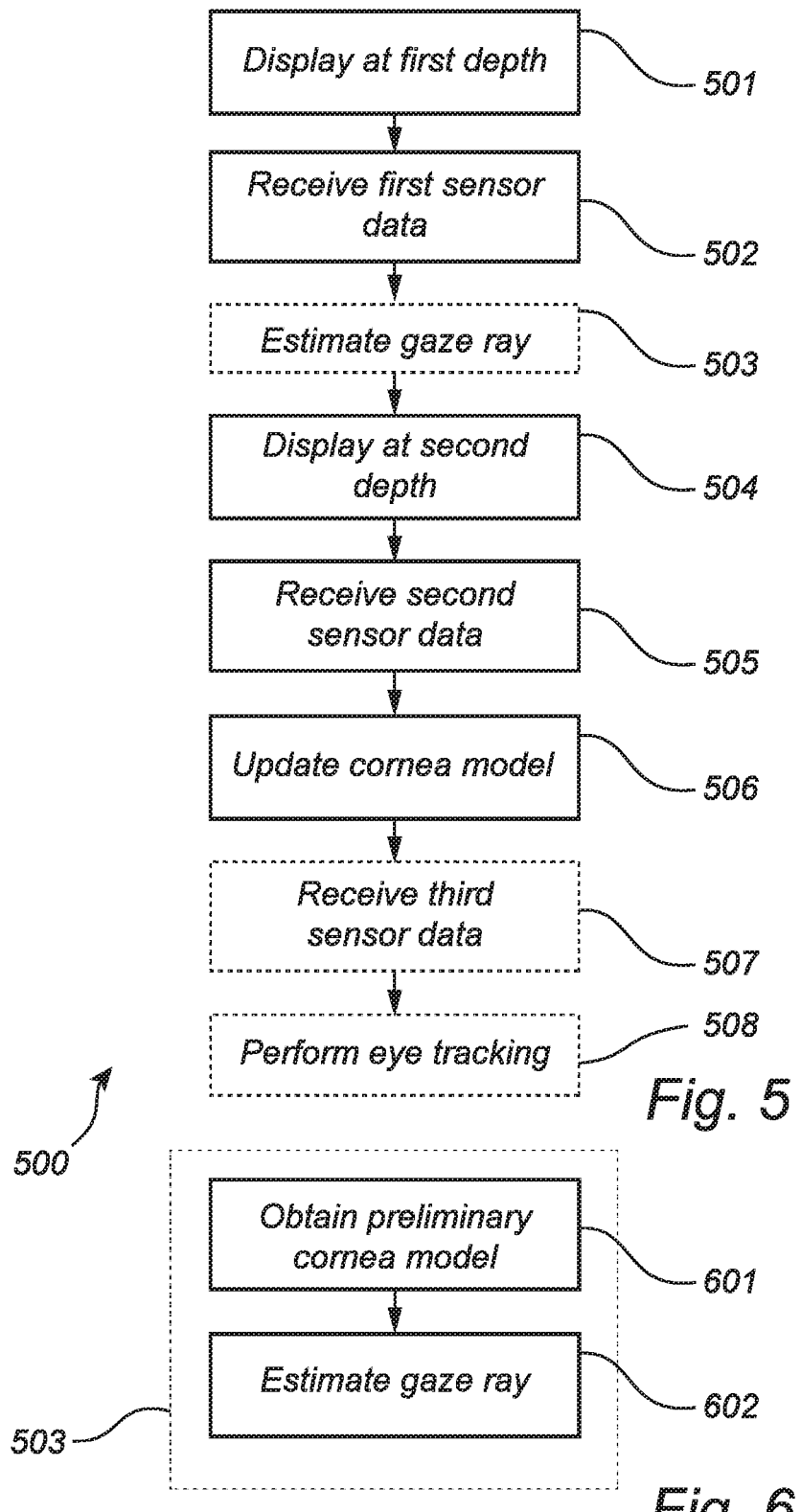

UPDATING A CORNEA MODEL

CROSS-REFERENCES TO RELATED APPLICATIONS

This application claims priority to Swedish Application No. 1950388-7, filed Mar. 29, 2019; the content of which are hereby incorporated by reference.

TECHNICAL FIELD

The present disclosure generally relates to eye tracking.

BACKGROUND

Different techniques have been developed for monitoring in which direction (or at which point on a display) a user is looking. This is often referred to as gaze tracking. Another term often employed in this context is eye tracking, which may also involve tracking of a gaze direction and/or a gaze point. However, eye tracking need not necessarily involve tracking of a gaze direction or a gaze point. In some cases, eye tracking involves tracking of a position of the eye in space, without actually tracking/estimating where the eye is looking.

Eye tracking techniques often involve detection of certain features in images of the eye, and a gaze direction or gaze point is then computed based on positions of these detected features. An example of such an eye tracking technique is pupil center corneal reflection (PCCR). PCCR-based eye tracking employs the position of the pupil center and the position of glints (reflections of illuminators at the cornea) to compute a gaze direction of the eye or a gaze point at a display.

Eye tracking techniques often employ a model of the cornea, for example to compute how light rays from illuminators are reflected at the cornea. Such a cornea model may for example include a shape the cornea and a position of the cornea relative other parts of the eye (for example a distance between the cornea and the pupil center). Although the corneas of different eyes may be quite similar in shape and position, even small deviations may affect eye tracking performance. If several cameras and illuminators are available, then the shape of the cornea may be determined with relatively high accuracy. If, on the other hand, a single-camera eye tracker is employed, then it is typically more difficult to determine an accurate cornea model. Hence, single-camera eye trackers often need to make do with a less accurate cornea model. Imperfections in the cornea model may to at least some extent be compensated for via calibration of the eye tracker, for example by asking the user to look at certain known reference/stimulus points at a display. However, such compensation is not always sufficient to provide desired eye tracking performance. For example, in the case of remote eye tracking (such as an eye tracker mounted below a stationary computer display), such compensation may rely on the assumption that users will not move their head too much relative to the eye tracker.

It would be desirable to provide new ways to address one or more of the abovementioned issues.

SUMMARY

Methods, systems and computer-readable storage media having the features defined in the independent claims are provided for addressing one or more of the abovementioned issues. Preferable embodiments are defined in the dependent claims.

Hence, a first aspect provides embodiments of a method of updating a cornea model for a cornea of an eye. The method comprises controlling a display to display a stimulus at a first depth. The display is capable of displaying objects at different depths. The method comprises receiving first sensor data obtained by an eye tracking sensor while the stimulus is displayed at the first depth by the display. The method comprises controlling the display to display a stimulus at a second depth. The second depth is different than the first depth. The method comprises receiving second sensor data obtained by the eye tracking sensor while the stimulus is displayed at the second depth by the display. The method comprises updating the cornea model based on the first sensor data and the second sensor data.

As described above in the background section, use of an inaccurate cornea model may affect eye tracking performance. Stimuli located at different depths may be employed to determine a more accurate cornea model.

A second aspect provides embodiments of a system for updating a cornea model for a cornea of an eye. The system comprises processing circuitry (or one or more processors) configured to control a display to display a stimulus at a first depth. The display is capable of displaying objects at different depths. The processing circuitry is configured to receive first sensor data obtained by an eye tracking sensor while the stimulus is displayed at the first depth by the display, and control the display to display a stimulus at a second depth. The second depth is different than the first depth. The processing circuitry is configured to receive second sensor data obtained by the eye tracking sensor while the stimulus is displayed at the second depth by the display, and update the cornea model based on the first sensor data and the second sensor data.

The processing circuitry (or one or more processors) may for example be configured to perform the method as defined in any of the embodiments of the first aspect disclosed herein (in other words, in the claims, or the summary, or the detailed description, or the drawings). The system may for example comprise one or more non-transitory computer-readable storage media (or one or more memories) storing instructions that, upon execution by the processing circuitry (or one or more processors), cause the system to perform the method as defined in any of the embodiments of the first aspect disclosed herein.

The effects and/or advantages presented in the present disclosure for embodiments of the method according to the first aspect may also apply to corresponding embodiments of the system according to the second aspect.

A third aspect provides embodiments of a non-transitory computer-readable storage medium storing instructions for updating a cornea model for a cornea of an eye. The instructions, when executed by a system, cause the system to:
control a display to display a stimulus at a first depth, wherein the display is capable of displaying objects at different depths;
receive first sensor data obtained by an eye tracking sensor while the stimulus is displayed at the first depth by the display;
control the display to display a stimulus at a second depth, wherein the second depth is different than the first depth;

receive second sensor data obtained by the eye tracking sensor while the stimulus is displayed at the second depth by the display; and update the cornea model based on the first sensor data and the second sensor data.

The non-transitory computer-readable storage medium may for example store instructions which, when executed by a system (or by processing circuitry comprised in the system), cause the system to perform the method as defined in any of the embodiments of the first aspect disclosed herein (in other words, in the claims, or the summary, or the drawings, or the detailed description).

The non-transitory computer-readable storage medium may for example be provided in a computer program product. In other words, a computer program product may for example comprise a non-transitory computer-readable storage medium storing instructions which, when executed by a system, cause the system to perform the method as defined in any of the embodiments of the first aspect disclosed herein.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In what follows, example embodiments will be described in greater detail with reference to the accompanying drawings, on which:

FIG. 5 is a flow chart of method of updating a cornea model, according to an embodiment;

FIG. 6 shows a scheme for how a gaze ray be estimated in the method in FIG. 5, according to an embodiment;

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Throughout the present disclosure, the term eye tracking sensor relates to a sensor which is adapted to obtain sensor data for use in eye tracking. While an eye tracking sensor may for example be an imaging device (such as a camera), several other types of sensors could be employed for eye tracking. For example, an eye tracking sensor may employ light, sound, a magnetic field, or an electric field to obtain sensor data which may be employed (for example in combination with sensor data from other sensors) for determining where the eye is located and/or in which direction the eye is gazing. An eye tracking sensor may for example be arranged to (or configured to) monitor an eye. An eye tracking sensor may for example be arranged to (or configured to) perform measurements (or to obtain sensor data) when instructed to do so. In other words, an eye tracking sensor need not necessarily perform a constant/continuous monitoring of the eye.

Throughout the present disclosure, the term imaging device relates to a device which is adapted to capture images. An imaging device may for example be an image sensor or a camera, such as a charge-coupled device (CCD) camera or a Complementary Metal Oxide Semiconductor (CMOS) camera. However, other types of imaging devices may also be envisaged.

Embodiments of methods, systems, and associated storage media will be described below with reference to FIGS. 3-11. First, certain features of an eye will be described with reference to FIGS. 1-2.

Figure 1:
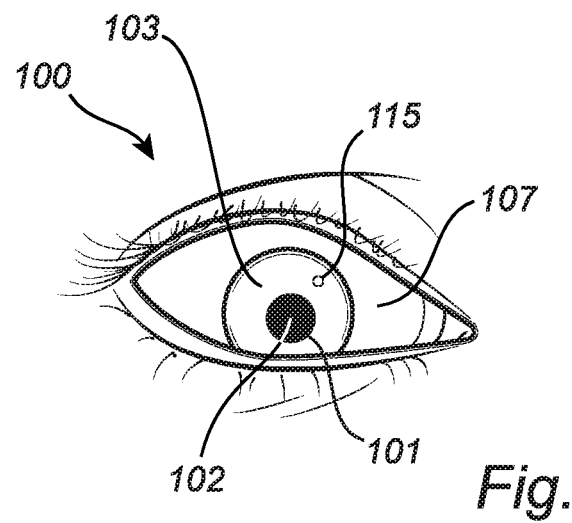
FIG. 1 is a front view of an eye.
Figure 2:
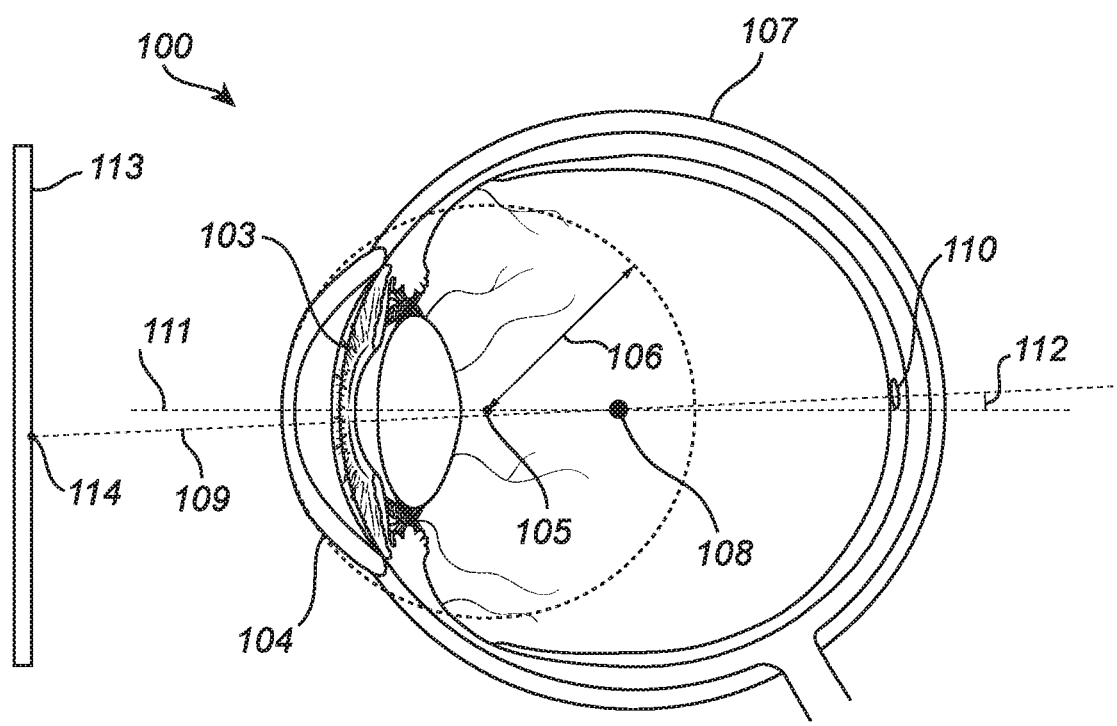
FIG. 2 is a cross sectional view of the eye from FIG. 1 from the side of the eye.

FIG. 1 is a front view of an eye 100. FIG. 2 is a cross sectional view of the eye 100 from the side of the eye 100. While FIG. 2 shows more or less the entire eye 100, the front view presented in FIG. 1 only shows those parts of the eye 100 which are typically visible from in front of a person's face. The eye 100 has a pupil 101, which has a pupil center 102. The eye 100 also has an iris 103 and a cornea 104. The cornea 104 is located in front of the pupil 101 and the iris 103. The cornea 104 is curved. The cornea 104 is often modeled as a spherical surface with a center of curvature 105 which is simply referred to as the cornea center 105. In such a spherical cornea model, the cornea 104 has a radius of curvature referred to as the radius 106 of the cornea 104 or simply the cornea radius 106. In reality, the cornea 104 is typically not perfectly spherical. A non-spherical cornea model may therefore be employed. In such a non-spherical cornea model, the radius of curvature is different for different points along the cornea 104. Hence, if a non-spherical cornea model is employed, the term "cornea radius" may be employed to refer to the radius of curvature at a point or region of the cornea 104. It will be appreciated that at least some embodiments provided in the present disclosure may be employed with a spherical cornea model as well as with a non-spherical cornea model. The eye 100 also has a sclera 107. The eye 100 has a center 108 which may also be referred to as the center 108 of the eye ball, or simply the eye ball center 108. The visual axis 109 of the eye 100 passes through the center 108 of the eye 100 to the fovea 110 of the eye 100. The optical axis 111 of the eye 100 passes through the pupil center 102 and the center 108 of the eye 100. The visual axis 109 forms an angle 112 relative to the optical axis 111. The deviation or offset between the visual axis 109 and the optical axis 111 is often referred to as the fovea offset 112. In the example shown in FIG. 2, the eye 100 is looking towards a display 113, and the eye 100 is gazing at a gaze point 114 at the display 113. FIG. 1 also shows a reflection 115 of an illuminator at the cornea 104. Such a reflection 115 is also known as a glint 115.

Figure 3:
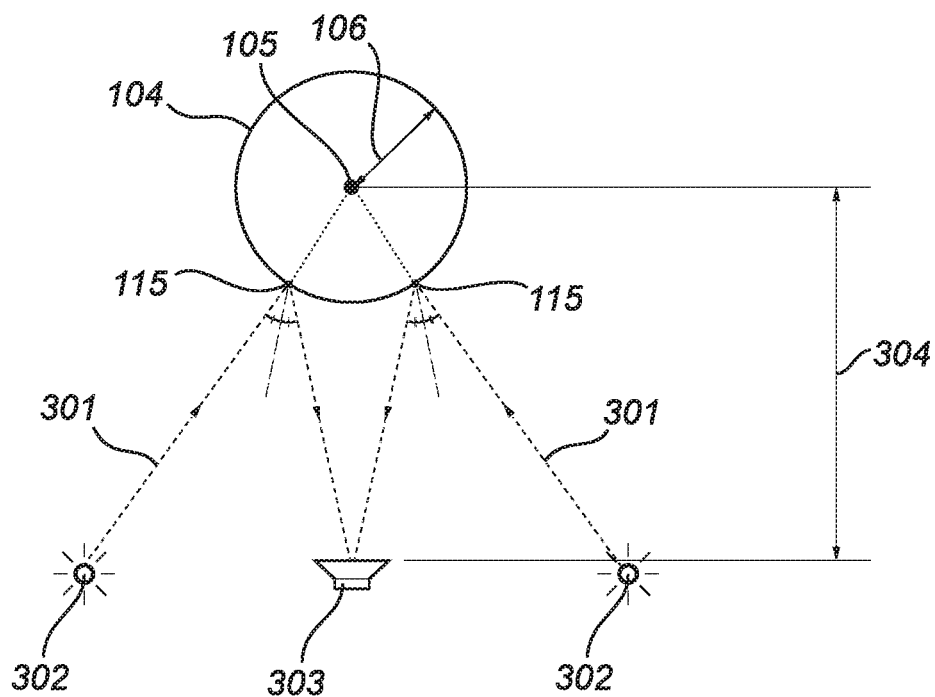
FIG. 3 shows example light paths from illuminators to an imaging device via reflection at a cornea.

FIG. 3 shows example light paths 301 from illuminators 302 to an imaging device 303 via reflection at a cornea 104 of an eye. For simplicity, the cornea 104 in FIG. 3 is modeled as a sphere, rather than the more realistic shape showed in FIG. 2. It will be appreciated that in reality, the cornea 104 only covers a front portion of such a sphere. The illuminators 302 are located at known positions relative to the imaging device 303, but the position of the cornea 104 is unknown. Glints 115 are formed where the light rays 301 are reflected at the cornea 104.

If the cornea radius 106 is known, then the position of the cornea center 105 may be computed via the positions of the glints 115 as observed from the imaging device 303. Thereby, the distance 304 from the imaging device 303 to the cornea center 105 may also be computed. If the cornea radius 106 is overestimated, then the computed distance 304 from the imaging device 303 to the cornea center 105 will be too short. Hence, user distance estimates provided by an eye tracking system using a too large cornea radius will typically be too small. If, on the other hand, the cornea radius 106 is underestimated, then the computed distance 304 from the imaging device 303 to the cornea center 105 will be too long. Hence, user distance estimates provided by an eye tracking system using a too small cornea radius will typically be too large.

Many single-camera eye tracking systems are not able to determine the cornea radius 106. This means that any distance measure output by such an eye tracking system is incorrect, and is only valid relative to other measurement values output by the eye tracking system. The gaze accuracy of the eye tracking system may be relatively good anyway because gaze angles may be rescaled to compensate for distance estimate errors. Such compensation may work well enough if the gaze points are all in the same plane and the user does not move their head relative to the eye tracker overly much. In virtual reality (VR) and augmented reality (AR), there is a desire to have accurate depth measurements (or user distance measurements), as well as the need to support good accuracy for observed objects at multiple distances from the user (viewing depth). This is especially the case for systems with vari-focal displays or multi-focal displays.

Figure 4:
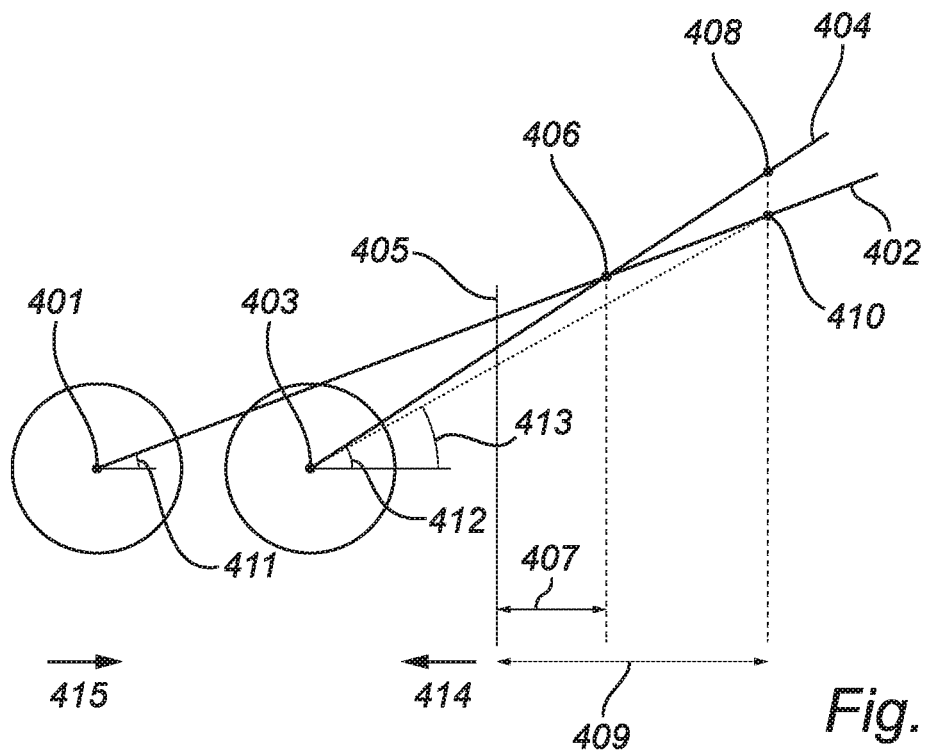
FIG. 4 shows gaze rays for an eye looking at stimuli displayed at different depths.

FIG. 4 shows gaze rays for an eye looking at stimuli displayed at different depths by a display. FIG. 4 shows a measured/estimated cornea position 401 and an associated gaze ray 402 as well as an actual/true cornea position 403 and an associated gaze ray 404. FIG. 4 also shows a lens 405 of the display, a first stimulus point 406 at a first depth 407, a second stimulus point 408 at a second depth 409, and a third stimulus point 410 also at the second depth 409.

We do not know the true cornea position 403, but only have the estimated cornea position 401, since the actual/true cornea radius is unknown. The true cornea position 403 can be either closer to the lens 405 than the estimated cornea position 401 (as in FIG. 4), or further away. Gaze estimation may work anyway if the cornea position error is compensated for by scaling the observed gaze angle so that the gaze ray passes through the calibration points which were used in calibration. In FIG. 4, this is seen in the gaze ray 402 from the estimated cornea position 401 being at a different angle 411 than the angle 412 of the true gaze ray 404 extending from the true cornea position 403. Thanks to the compensation, both the estimated gaze ray 402 and the true gaze ray 404 pass through the true gaze point 406. As can also be seen in FIG. 4, the angle difference causes problems when the user is observing a point 408 further away. If the point 408 were located along the true gaze ray 404, as in FIG. 4, the user would not notice a change (if the size of the stimulus point is scaled accordingly) and so the image of the eye seen by the eye tracking system would not change. Therefore, the gaze angle estimate should not change. As can be clearly seen in FIG. 4, we would in fact get a gaze error, since the estimated gaze ray 402 does not pass through the point 408.

To address this issue, a cornea model may be calibrated using stimuli points shown at different depths to the user.

A first example approach to do this, which is relatively easy and which is quite robust to noise, would be to show a stimulus/reference point 406 at a first depth 407 to the user. A gaze ray 402 from the estimated cornea center position 401 through the stimulus point 406 is estimated. The stimulus point 406 is then moved along the estimated gaze ray 402 to a second depth 409, so that we get a stimulus point 410 at the second depth 409 along the estimated gaze ray 402. If we already have the correct cornea radius (and thereby the correct cornea position), the movement of the stimulus point should be imperceptible to the user, and an image of the eye captured by the eye tracking system, should not change. However, since we most likely have an incorrect cornea radius (and thereby an incorrect cornea position) to start with, the user will typically perceive the stimulus point to be moving (up/down or left/right, depending on the original gaze angle), and the eye will move to track it, which we will observe with our eye tracking sensor. This is manifested in FIG. 4 by the fact that the stimulus point 406 corresponds to a true gaze angle 412 while the stimulus point 410 corresponds to a smaller true gaze angle 413. The direction in which the eye moves in order to track the stimulus point will let us know if we have overestimated or underestimated the cornea radius. We can adjust the estimated cornea radius and potentially repeat the above steps until the cornea radius estimate is satisfactory, as indicated by the image of the eye not changing when the stimulus point is moved along the estimated gaze ray. As can be seen in FIG. 4, one should avoid placing the first stimulus point 406 at zero gaze angle. Indeed, if the first stimulus point 406 were located at zero gaze angle, then the estimated gaze ray 402 and the true gaze ray 404 would be parallel even if the estimated cornea position 401 were located further away from the display than the true cornea position 403, so it would be difficult to detect that the cornea radius is incorrect and should be updated. Hence, the first stimulus point 406 should be placed at a non-zero gaze angle, such as at least somewhat upwards/downwards at the display or at least somewhat to the left/right at the display.

A second example approach would be to determine the cornea radius directly from one iteration through a comparison of the gaze angles observed for stimulus points at the first depth 407 and the second depth 409, but this would be more sensitive to noise in the gaze ray estimates than the first example approach.

In view of the above, a method of updating a cornea model for a cornea 104 of an eye 100 is proposed. Embodiments of the proposed method are described below with reference to FIGS. 5-8.

FIG. 5 is a flow chart of method 500 of updating a cornea model for a cornea 104 of an eye 100, according to an embodiment. The cornea model may for example include a shape of the cornea 104 and/or a radius of curvature 106 of the cornea 104 and/or a position of the cornea 104 relative to other parts of the eye 100 (for example a distance from the cornea 104 to a pupil center 102). It will be appreciated that updating of the cornea model may for example include updating (or modifying, or adjusting, or changing) of one or more parameters of the cornea model, and need not necessarily involve updating all parts/portions of the cornea model.

The method 500 comprises controlling 501 a display to display a stimulus at a first depth. The display is capable of displaying objects at different depths. The depth may for example be defined or measured in a direction which is parallel to a forward direction of the display (exemplified in FIG. 4 by the arrow 414 and in FIG. 9 by the arrow 905), and/or in a direction which is parallel to a forward direction of a user watching the display (exemplified in FIG. 4 by the arrow 415, and in FIG. 9 by the arrow 903). The depth may for example be defined or measured in a direction orthogonal to (or transverse to) a display screen (or display surface) of the display (exemplified in FIG. 9 by the direction 904 which is orthogonal to the display screen 901), in other words orthogonal to (or transverse to) a screen or surface at which objects may be displayed by the display. Example implementations of the display are described below in connection with FIG. 9. The stimulus may for example be a reference point or a symbol, but other stimuli may also be envisaged.

The method 500 comprises receiving 502 first sensor data obtained by an eye tracking sensor while the stimulus is displayed at the first depth by the display. In other words, the first sensor data is obtained by the eye tracking sensor while the stimulus is displayed by the display at the first depth. The step 502 of receiving the first sensor data may for example be performed more or less immediately when the first sensor data is obtained by the eye tracking sensor, or may be performed at a later point in time.

The method 500 comprises controlling 504 the display to display a stimulus at a second depth. The second depth is different than (or distinct from) the first depth. The stimulus displayed at the second depth may for example be similar to (or identical to) to the stimulus displayed at the first depth. However, embodiments may also be envisaged in which different types of stimuli are employed in the steps 501 and 504 in the method 500.

The method 500 comprises receiving 505 second sensor data obtained by the eye tracking sensor while a stimulus is displayed at the second depth by the display. In other words, the second sensor data is obtained by the eye tracking sensor while the stimulus is displayed by the display at the second depth. The step 505 of receiving the second sensor data may for example be performed more or less immediately when the second sensor data is obtained by the eye tracking sensor, or may be performed at a later point in time.

The method 500 comprises updating 506 the cornea model based on the first sensor data and the second sensor data. It will be appreciated that the step 506 of updating the cornea model may for example be based also on additional sensor data.

The stimulus at the first depth in step 501 of the method 500 is exemplified in FIG. 4 by the first stimulus point 406. The stimulus at the second depth in step 504 in the method 500 is exemplified in FIG. 4 by the third stimulus point 410.

As described above in the background section, use of an inaccurate cornea model may affect eye tracking performance. As described above with reference to FIG. 4, stimuli located at different depths may be employed to determine a more accurate cornea model, whereby eye tracking performance may be improved.

The method 500 may for example be a computer-implemented method.

According to some embodiments, the step of controlling 501 a display to display a stimulus at the first depth may for example include providing (or outputting) signaling for causing the display to display the stimulus at the first depth. Similarly, the step of controlling 504 a display to display a stimulus at the second depth may for example include providing (or outputting) signaling for causing the display to display the stimulus at the second depth.

According to some embodiments, the eye tracking sensor employed in the method 500 is an imaging device, such as a camera. The first sensor data (received at step 502) may for example comprise an image of the eye captured by the imaging device while a stimulus is displayed at the first depth, and the second sensor data (received at step 505) may for example comprise an image of the eye captured by the imaging device while a stimulus is displayed at the second depth. However, embodiments may also be envisaged in which the first sensor data (and similarly the second sensor data) represents a value indicative of an angle and/or distance, such as from a pressure sensitive sensor (lens or similar) or, in case of physical stimulations, time-of-flight measurements.

According to some embodiments, the method 500 described above with reference to FIG. 5 is a method of updating a cornea model of a single-camera eye tracker (or of a single-camera eye tracking system). In other words, the method 500 may be employed by an eye tracker equipped with no more than one camera. It will be appreciated that the method 500 could also be employed for updating a cornea model of a multi-camera eye tracker. However, as described above in the background section, there are ways for eye trackers with several cameras and illuminators to determine an accurate cornea model also without the method 500. The method 500 may be employed for single-camera eye trackers, which may be cheaper and/or occupy less space than multi-camera eye trackers. In addition to the additional hardware cost of having multiple cameras, another potential issue with multi-camera eye trackers is that you typically need careful calibration between the different cameras of the eye tracker for the eye tracker to perform well.

According to some embodiments, the cornea model which is updated in the method 500 is parameterized by a parameter indicative of a radius of curvature 106 of the cornea 104. The step of updating 506 the cornea model may comprise updating a value of that parameter. The parameter may for example be the cornea radius 106 itself, or some other parameter controlling the cornea radius 106 in the cornea model. The cornea model may for example be a single-parameter model. In other words, the cornea model may include a single parameter for which a value may be determined to calibrate the cornea model. The cornea model may for example be scalable based on a value of the parameter. The cornea model may for example be a spherical cornea model, and the parameter may for example be the radius or diameter of the sphere. The cornea model may for example be a non-spherical cornea model, and the parameter may for example be a minimum radius of curvature of the model, a maximum radius of curvature of the model, or a mean radius of curvature of the model.

According to some embodiments, the method 500 comprises receiving 507 third sensor data obtained by the eye tracking sensor, and estimating 508, based on the third sensor data and the updated cornea model:
a position of the eye 100 in space; and/or
a gaze ray of the eye 100; and/or
a gaze point of the eye 100.

In other words, after the cornea model has been updated at step 506, it may be employed for eye tracking. A position of the eye 100 in space may for example be expressed in the form of a center 108 of the eye ball, or in the form of a center 105 of corneal curvature. A gaze ray of the eye 100 may for example be expressed in the form of two points along the gaze ray, or a point along the gaze ray and a vector parallel to the gaze ray. A gaze point of the eye 100 may for example be a gaze point 114 at a display.

According to some embodiments, the method 500 comprises estimating 503 a gaze ray of the eye 100. The stimulus displayed by the display at the first depth (as specified in step 501) and the stimulus displayed by the display at the second depth (as specified at step 504) may be displayed by the display along the estimated gaze ray.

The step 503 of estimating a gaze ray for the eye 100 may for example be performed after the step 502 of receiving the first sensor data. The estimation 503 of the gaze ray may for example be based on the first set of sensor data received at step 502 (and may optionally also be further based on additional sensor data). The estimated gaze ray may for example be a gaze ray starting at an estimated cornea center position and passing through a position where the stimulus was displayed by the display at the first depth.

The gaze ray estimated at step 503 is exemplified in FIG. 4 by the estimated gaze ray 402 starting at the estimated cornea position 401 and passing through the stimulus point 406. The stimuli displayed by the display at the first depth and the second depth along the estimated gaze ray 402 are exemplified in FIG. 4 by the stimulus points 406 and 410, respectively.

FIG. 6 shows a scheme for how a gaze ray be estimated in the method 500 in FIG. 5, according to an embodiment. In the present embodiment, the step 503 of estimating a gaze ray of the eye comprises obtaining 601 a preliminary version of the cornea model, and estimating 602 a gaze ray of the eye based on the preliminary version of the cornea model. The preliminary version of the cornea model may for example be obtained via some form of estimation or computation, for example during calibration of an eye tracker. The preliminary cornea model may for example be a default cornea model retrieved from a memory. The same default cornea model may for example be employed for multiple users. The gaze ray may for example be estimated 602 based on the preliminary version of the cornea model in combination with sensor data from the eye tracking sensor.

According to some embodiments, the step 506 of updating the cornea model is performed in response to detection of a difference between content of the first sensor data (received at step 502) and content of the second sensor data (received at step 505). As described above with reference to FIG. 4, if an estimated gaze ray is correct, then moving a stimulus between different depths along the estimated gaze ray should not affect the sensor data obtained by the eye tracking sensor since the eye should maintain its gaze in the same direction while the stimulus moves. The content of the first and second sensor data should therefore be similar. A difference between the content of the first sensor data and the content of the second sensor data may indicate that the estimated gaze ray is incorrect. As described above with reference to FIG. 4, the fact that an estimated gaze ray is incorrect may indicate that a currently employed cornea model (such as the preliminary cornea model which is employed at step 602 for estimating a gaze ray) is inaccurate.

According to some embodiments, the method 500 comprises estimating a first position of a pupil 101 of the eye 100 based on the first sensor data (received at step 502), and estimating a second position of the pupil 101 based on the second sensor data (received at step 505). The step 506 of updating the cornea model may be based on a deviation between the first position of the pupil 101 and the second position of the pupil 101. As described above with reference to FIG. 4, if an estimated gaze ray is correct, then moving a stimulus between different depths along the estimated gaze ray should not affect the position of the pupil 101 since the eye 100 should maintain its gaze in the same direction while the stimulus moves. The first and second position of the pupil 101 should therefore be similar. A difference between the first and second position of the pupil 101 may indicate that the estimated gaze ray is incorrect. As described above with reference to FIG. 4, the fact that an estimated gaze ray is incorrect may indicate that a currently employed cornea model (such as the preliminary cornea model which is employed at step 602 for estimating a gaze ray) is inaccurate.

According to some embodiments, the method 500 comprises estimating a first gaze angle based on the first sensor data (received at step 502), and estimating a second gaze angle based on the second sensor data (received at step 505). The step 506 of updating of the cornea model may be based on a deviation between the first gaze angle and the second gaze angle. The first gaze angle is exemplified in FIG. 4 by the gaze angle 412 for the stimulus point 406 and the second gaze angle is exemplified in FIG. 4 by the gaze angle 413 for the stimulus point 410. As described above with reference to FIG. 4, if an estimated gaze ray is correct, then moving a stimulus between different depths along the estimated gaze ray should not affect the gaze angle since the eye should maintain its gaze in the same direction while the stimulus moves. The first and second gaze angles should therefore be similar. A difference between the first and second gaze angles may indicate that the estimated gaze ray is incorrect. As described above with reference to FIG. 4, the fact that an estimated gaze ray is incorrect may indicate that a currently employed cornea model (such as the preliminary cornea model which is employed at step 602 for estimating a gaze ray) is inaccurate.

Throughout the present disclosure, a gaze angle may be defined as an angle formed between an estimated gaze ray and a forward direction of the user (exemplified in FIG. 4 by the arrow 415), or as an angle formed between an estimated gaze ray and a potential gaze ray directed towards a central position of the display.

Figure 7:
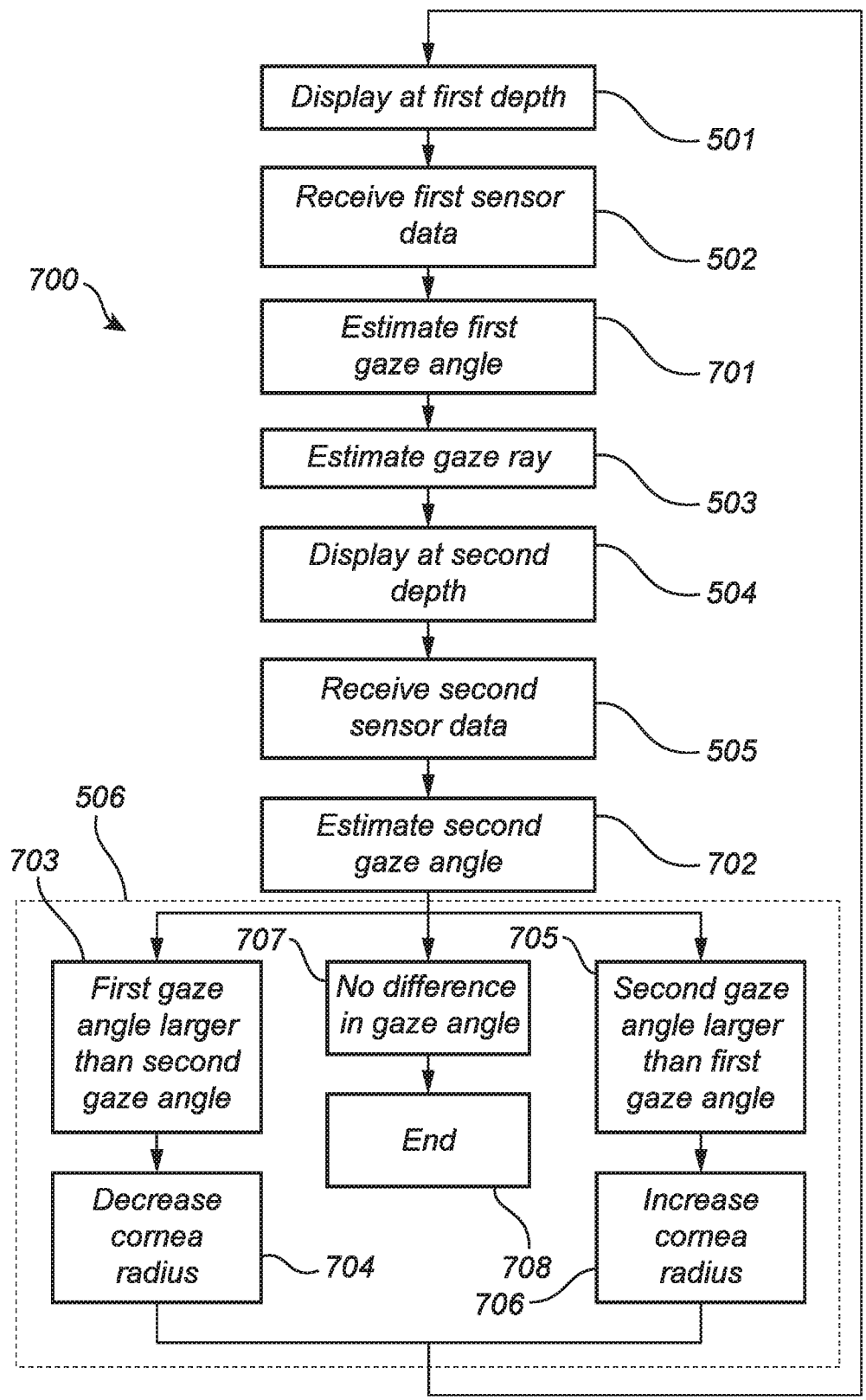
FIG. 7 is a flow chart of method of updating a cornea model, where the cornea model may be updated several times, according to an embodiment.

FIG. 7 is a flow chart of method 700 of updating a cornea model, where the cornea model may be updated several times, according to an embodiment. The method 700 comprises the steps 501-505 from the method 500, described above with reference to FIG. 5. The description of those steps will not be repeated here.

The method 700 comprises estimating 701 a first gaze angle based on the first sensor data (received at step 502), and estimating 702 a second gaze angle based on the second sensor data (received at step 505). The stimulus displayed by the display at the first depth and the stimulus displayed by the display at the second depth are both displayed by the display along the gaze ray estimated at step 503. The stimulus displayed at the second depth is displayed further away from the eye along the estimated gaze ray than the stimulus displayed at the first depth. This is exemplified in FIG. 4 by the stimulus point 406 displayed at depth 407 and the stimulus point 410 displayed at depth 409, where both stimulus points 406 and 410 are located along the estimated gaze ray 402. The first gaze angle is exemplified in FIG. 4 by the gaze angle 412 for the stimulus point 406 and the second gaze angle is exemplified in FIG. 4 by the gaze angle 413 for the stimulus point 410.

The method 700 comprises the step 506 from the method 500 described above with reference to FIG. 5. In the method 700, the step 506 of updating of the cornea model comprises decreasing 704 a radius of curvature 106 of the cornea 104 in response to the first estimated gaze angle exceeding 703 the second estimated gaze angle. In other words, the two gaze angles are compared. With reference to the example shown in FIG. 4, if the first gaze angle 412 is larger than the second gaze angle 413 (this case is indicated by 703 in FIG. 7), this implies that the true cornea position 403 is located closer to the display than the estimated cornea position 401. This implies that the true cornea radius is smaller than the currently employed cornea radius, whereby the cornea radius in the cornea model should be decreased. The size of the difference between the first and second estimated gaze angles may for example be employed for determining how much to decrease 704 the cornea radius. A relatively large difference may indicate that a relatively large decrease is needed, while a relatively small difference may indicate that a relatively small decrease is needed.

In the method 700, the step 506 of updating of the cornea model also comprises increasing 706 a radius of curvature 106 of the cornea 104 in response to the second estimated gaze angle exceeding 705 the first estimated gaze angle. In other words, the two gaze angles are compared. With reference to the example shown in FIG. 4, if the second gaze angle 413 were larger than the first gaze angle 412 (which is not the case in FIG. 4, but this case is indicated by 705 in FIG. 7), this would imply that the true cornea position 403 was located further away from the display than the estimated cornea position 401. This would imply that the true cornea radius is larger than the currently employed cornea radius, whereby the cornea radius 104 in the cornea model should be increased. The size of the difference between the first and second estimated gaze angles may for example be employed for determining how much to increase 706 the cornea radius. A relatively large difference may indicate that a relatively large increase is needed, while a relatively small difference may indicate that a relatively small increase is needed.

If no difference is detected between the first and second gaze angles (as indicated by 707 in FIG. 7), then the cornea radius seems to be correct and should not be updated, so the method 700 may end 708.

As indicated in FIG. 7, the method 700 may for example repeat the steps 501-506 and 701-702 if the cornea radius was decreased 704 or increased 706. These steps 501-506 and 701-702 may for example be repeated until a correct cornea radius has been obtained and the method 700 ends at step 708. Even if not all of the steps 501-506 and 701-702 are repeated, the method 700 may for example comprise estimating a new gaze ray of the eye based on the updated cornea model, controlling the display to display stimuli at respective positions along the new estimated gaze ray at respective time instances, receiving new sensor data obtained by the eye tracking sensor at the respective time instances, and updating the cornea model based on the new sensor data.

Figure 8:
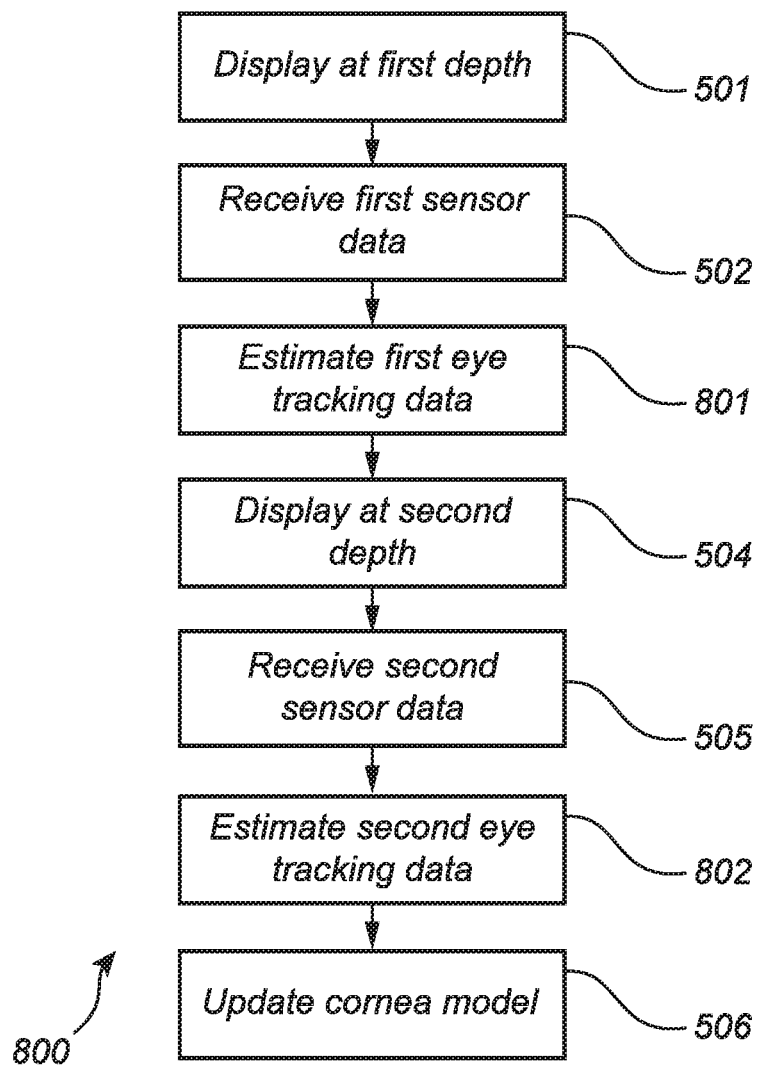
FIG. 8 is a flow chart of method of updating a cornea model, including estimation of eye tracking data, according to an embodiment.

FIG. 8 is a flow chart of method 800 of updating a cornea model, including estimation of eye tracking data, according to an embodiment. The method 800 comprises the steps 501-505 from the method 500 described above with reference to FIG. 5. The description of those steps will not be repeated here.

The method 800 comprises estimating 801, based on the first sensor data (received at step 502), first eye tracking data indicative of:
a gaze angle; and/or
a gaze ray; and/or
a gaze point; and The method 800 comprises estimating 802, based on the second sensor data (received at step 505), second eye tracking data indicative of:
a gaze angle; and/or
a gaze ray; and/or
a gaze point;

The method 800 comprises the step 506 from the method 500 described above with reference to FIG. 5. In the method 800, the step 506 of updating of the cornea model is based on the first eye tracking data and the second eye tracking data.

According to some embodiments, the display employed in the methods 500, 700 and 800 may be capable of displaying objects at different depths by at least
relocating a display screen; and/or
relocating an optical element; and/or
changing an optical property of an optical element.

The display may for example comprise a display screen or display surface at which objects are displayed. This display screen/surface may for example be moved or translated in a direction back and forth relative to a user, so as to display objects at different depths. The display may for example comprise an optical element such as a lens or mirror. This optical element may for example be moved, or translated or rotated for conveying an impression that an object is displayed at different depths. An optical property such as a focal length of the optical element (such as a lens or mirror) may for example be changed for conveying an impression that an object is displayed at different depths. The optical property of the optical element may for example be changed by altering a voltage.

Figure 9:
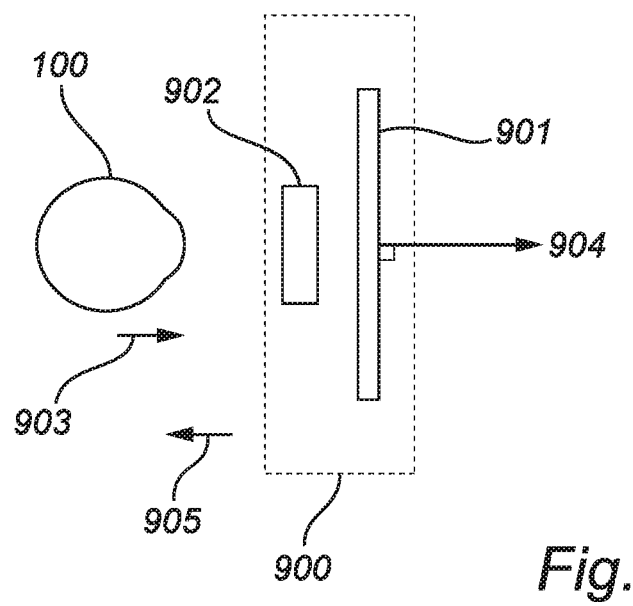
FIG. 9 is a schematic overview of an example display.

FIG. 9 is a schematic overview of an example display 900 which may be employed in the methods 500, 700 and 800. The display 900 comprises a display screen 901 at which objects are displayed, and an optical element 902 in the form of a lens. The display 900 may be able to display objects at different depths by moving the display screen 901 back and forth in a forward direction 903 of a user watching the display 900, or in a forward direction 905 of the display 900. Expressed differently, the display screen 901 may be movable in a direction 904 orthogonal to the display screen 901. The display 900 may be able to display objects at different depths by moving the optical element 902 back and forth in a forward direction 903 of a user watching the display 900, or in a forward direction 905 of the display 900. Expressed differently, the optical element 902 may be movable in a direction 904 orthogonal to the display screen 901. The display 900 may be able to display objects at different depths by changing an optical property of the optical element 902.

It will be appreciated that the display shown in FIG. 9 is only indented as a simple example, and that other displays may also be employed in the methods 500, 700 and 800.

According to some embodiments, the display employed in the methods 500, 700 and 800 is a vari- or multi-focal display capable of displaying objects at multiple depths.

Figure 10:
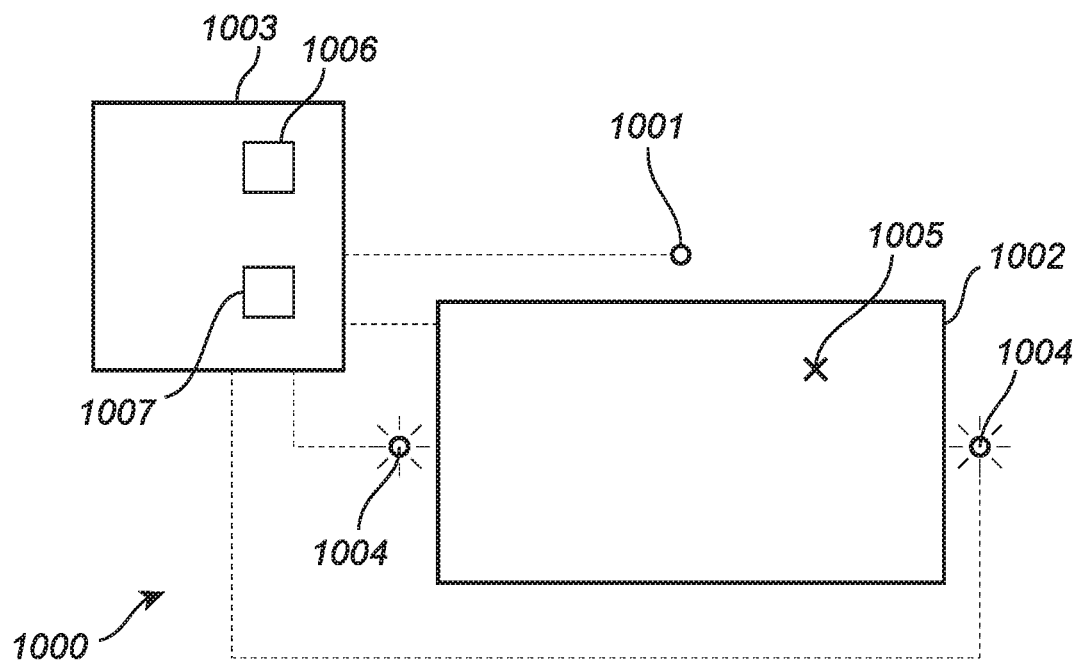
FIG. 10 is a schematic overview of a system for updating a cornea model, according to an embodiment.

FIG. 10 is a schematic overview of system 1000 for updating a cornea model for a cornea 104 of an eye 100, according to an embodiment. The system 1000 comprises one or more eye tracking sensors 1001 adapted to obtain sensor data while the eye 100 watches a display 1002, and processing circuitry 1003 configured to process sensor data from the one or more eye tracking sensors 1001. The processing circuitry 1003 may be configured to perform the method 500, the method 700 or the method 800. The eye tracking sensors 1001 need not necessarily be regarded as part of the system 1000. In other words, the system 1000 could for example comprise only the processing circuitry 1003.

As described above, the eye tracking sensors 1001 may be imaging devices for capturing images of the eye 100 while the eye 100 looks at the display 1002, but the eye tracking sensors 1001 could also be some other types of sensors. If the eye tracking sensors 1001 are imaging devices, then the system 1000 may comprise one or more illuminators 1004 for illuminating the eye 100 (for example to provide glints at the cornea 104 of the eye 100).

The processing circuitry 1003 is communicatively connected to the eye tracking sensors 1001, for example via a wired or wireless connection. The processing circuitry 1003 may also be communicatively connected to the display 1002, for example for controlling (or triggering) the display 1002 to show stimulus points 1005. The processing circuitry 1003 may also be communicatively connected to the illuminators 1004.

The illuminators 1004 may for example be infrared or near infrared illuminators, for example in the form of light emitting diodes (LEDs). However, other types of illuminators may also be envisaged. FIG. 10 shows example illuminators 1004 located at either side of the display 1002, but the illuminators 1004 could be located elsewhere.

FIG. 10 shows an example eye tracking sensor 1001 located above the display 1002, but eye tracking sensors 1001 could be located elsewhere, for example below the display 1002.

The display 1002 may for example be a liquid-crystal display (LCD) or a LED display. However, other types of displays may also be envisaged. The display may 1002 may for example be flat or curved. The display 1002 may for example be a TV screen, a computer screen, or may be part of a head-mounted device (HMD) such as a virtual reality (VR) or augmented reality (AR) device. The display 1002 may for example be placed in front of one of the user's eyes. In other words, separate displays 1002 may be employed for the left and right eyes. Separate eye tracking equipment (such as illuminators 1004 and eye tracking sensors 1001) may for example be employed for the left and right eyes.

The processing circuitry 1003 may be employed for both eyes, or there may be separate processing circuitry 1003 for the left and right eyes.

The system 1000 may for example be an eye tracking system or a gaze tracking system. The system 1000 may for example perform eye tracking for the left and right eyes separately, and may then determine a combined gaze point as an average of the gaze points for the left and right eyes.

The processing circuitry 1003 may for example comprise one or more processors 1006. The processor(s) 1006 may for example be application-specific integrated circuits (ASIC) configured to perform a specific method. Alternatively, the processor(s) 1006 may configured to execute instructions (for example in the form of a computer program) stored in one or more memories 1007. Such a memory 1007 may for example be comprised in the circuitry 1003 of the system 1000, or may be external to (for example located remotely from) the system 1000. The memory 1007 may store instructions for causing the system 1000 to perform the method 500, the method 700 or the method 800.

It will be appreciated that the system 1000 described above with reference to FIG. 10 is provided as an example, and that many other systems may be envisaged. For example, the illuminators 1004 and/or the eye tracking sensor 1001 need not necessarily be regarded as part of the system 1000. The system 1000 may for example consist only of the processing circuitry 1003. The display 1002 may for example be comprised in the system 1000, or may be regarded as separate from the system 1000.

The system 1000 described above with reference to FIG. 10 may for example be a single-camera eye tracking system.

Figure 11:
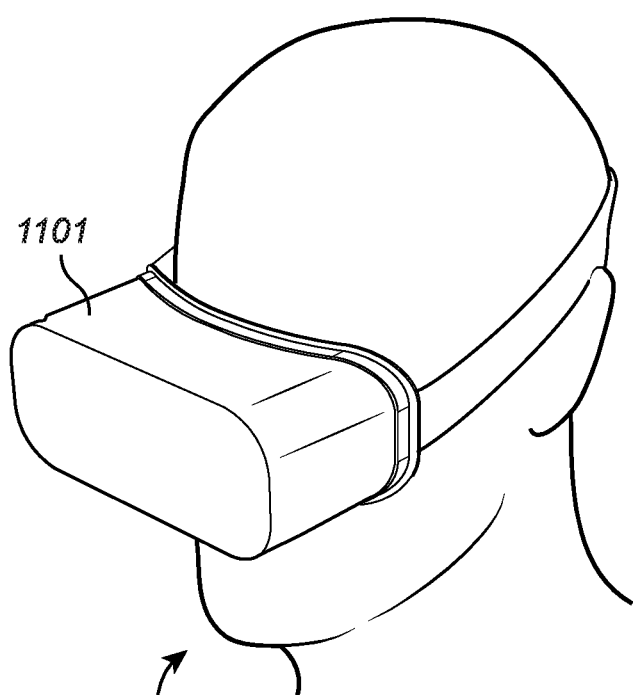
FIG. 11 shows a head-mounted display which may comprise the system in FIG. 10, according to an embodiment.

FIG. 11 shows a head-mounted device 1101 worn by a user 1102. The system 1000 described above with reference to FIG. 10 may for example be comprised in the head-mounted device 1101. The head-mounted device 1101 may for example be a virtual reality (VR) device (such as a VR display) or an augmented reality (AR) device (such as AR glasses).

As exemplified in FIG. 11, the methods 500, 700 and 800 may for example be performed by a wearable eye tracking system. However, the methods 500, 700 and 800 may also be employed by a system configured for remote eye tracking (such as an eye tracking system mounted at a stationary computer display). In the case of a remote eye tracking system, we could improve our distance estimates with better cornea radii estimates by showing the user stimuli points in 3D (in other words, at different depths). For such a remote eye tracking system, the stimuli points should be rendered in a 3D scene where the rendering camera is "placed" at the estimated user head location (between the eyes).

The methods and schemes described above with reference to FIGS. 4-8 represent a first aspect of the present disclosure. The system 1000 described above with reference to FIG. 10 represents a second aspect of the present disclosure. The system 1000 (or the processing circuitry 1003 of the system 1000) may for example be configured to perform the method of any of the embodiments of the first aspect described above. The system 1000 may for example be configured to perform the method 500 described above with reference to FIG. 5, or the method 700 described above with reference to FIG. 7, or the method 800 described above with reference to FIG. 8.

The system 1000 may for example comprise processing circuitry 1003 (or one or more processors 1006) and one or more memories 1007, the one or more memories 1007 containing instructions executable by the processing circuitry 1003 (or one or more processors 1006) whereby the system 1000 is operable to perform the method of any of the embodiments of the first aspect disclosed herein.

As described above with reference to FIG. 10, the system 1000 need not necessarily comprise all the elements shown in FIG. 10.

A third aspect of the present disclosure is represented by embodiments of a non-transitory computer-readable storage medium 1007 storing instructions which, when executed by the system 1000 (or by processing circuitry 1003 of the system 1000), cause the system 1000 to perform the method of any of the embodiments of the first aspect described above (such as the method 500 described above with reference to FIG. 5, or the method 700 described above with reference to FIG. 7, or the method 800 described above with reference to FIG. 8).

As described above with reference to FIG. 10, the storage medium 1007 need not necessarily be comprised in the system 1000.

The person skilled in the art realizes that the proposed approach presented in the present disclosure is by no means limited to the preferred embodiments described above. On the contrary, many modifications and variations are possible within the scope of the appended claims. For example, the methods and schemes described above with reference to FIGS. 4-8 may be combined to form further embodiments. Further, it will be appreciated that the system 1000 shown in FIG. 1000 is merely intended as an example, and that other systems may also perform the methods described above with reference to FIGS. 4-8. It will also be appreciated that the method steps described with reference to FIGS. 5, 6, 7 and 8 need not necessarily be performed in the specific order shown in these figures, unless otherwise indicated.

It will be appreciated that processing circuitry 1003 (or one or more processors) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium 1007 (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A method of updating a cornea model for a cornea of an eye, the method comprising:
controlling a display to display a stimulus at a first depth, wherein the display is capable of displaying objects at different depths;
receiving first sensor data obtained by an eye tracking sensor while the stimulus is displayed at the first depth by the display;
controlling the display to display a stimulus at a second depth, wherein the second depth is different than the first depth;
receiving second sensor data obtained by the eye tracking sensor while a stimulus is displayed at the second depth by the display; and
updating the cornea model based on the first sensor data and the second sensor data.

2. The method of claim 1, wherein the cornea model is parameterized by a parameter indicative of a radius of curvature of the cornea, and wherein the updating of the cornea model comprises:
updating a value of the parameter.

3. The method of claim 1, comprising:
estimating a gaze ray of the eye,
wherein the stimulus displayed by the display at the first depth and the stimulus displayed by the display at the second depth are displayed by the display along the estimated gaze ray.

4. The method of claim 3, wherein estimating a gaze ray of the eye comprises:
obtaining a preliminary version of the cornea model; and
estimating a gaze ray of the eye based on the preliminary version of the cornea model.

5. The method of claim 3, wherein the updating of the cornea model is performed in response to detection of a difference between content of the first sensor data and content of the second sensor data.

6. The method of claim 3, comprising:
estimating a first position of a pupil of the eye based on the first sensor data; and
estimating a second position of the pupil based on the second sensor data,
wherein the updating of the cornea model is based on a deviation between the first position of the pupil and the second position of the pupil.

7. The method of claim 3, comprising:
estimating a first gaze angle based on the first sensor data; and
estimating a second gaze angle based on the second sensor data,
wherein the updating the cornea model is based on a deviation between the first gaze angle and the second gaze angle.

8. The method of claim 3, comprising:
estimating a first gaze angle based on the first sensor data; and
estimating a second gaze angle based on the second sensor data,
wherein the stimulus displayed at the second depth is displayed further away from the eye along the estimated gaze ray than the stimulus displayed at the first depth, and wherein the updating of the cornea model comprises:
decreasing a radius of curvature of the cornea in response to the first estimated gaze angle exceeding the second estimated gaze angle; and/or
increasing a radius of curvature of the cornea in response to the second estimated gaze angle exceeding the first estimated gaze angle.

9. The method of claim 3, further comprising:
estimating a new gaze ray of the eye based on the updated cornea model;
controlling the display to display stimuli at respective positions along the new estimated gaze ray at respective time instances;
receiving new sensor data obtained by the eye tracking sensor at the respective time instances; and
updating the cornea model based on the new sensor data.

10. The method of claim 1, further comprising:
receiving third sensor data obtained by the eye tracking sensor; and
estimating, based on the third sensor data and the updated cornea model:
a position of the eye in space; and/or
a gaze ray of the eye; and/or
a gaze point of the eye.

11. The method of claim 1, wherein the eye tacking sensor is an imaging device.

12. The method of claim 11, wherein the first sensor data comprises an image of the eye captured by the imaging device while a stimulus is displayed by the display at the first depth, and wherein the second sensor data comprises an image of the eye captured by the imaging device while a stimulus is displayed by the display at the second depth.

13. The method of claim 11, wherein the method is a method of updating a cornea model of a single-camera eye tracker.

14. The method of claim 1, wherein the display is capable of displaying objects at different depths by at least:
relocating a display screen; and/or
relocating an optical element; and/or
changing an optical property of an optical element.

15. The method of claim 1, comprising:
estimating, based on the first sensor data, first eye tracking data indicative of:
a gaze angle; and/or
a gaze ray; and/or
a gaze point; and
estimating, based on the second sensor data, second eye tracking data indicative of:
a gaze angle; and/or
a gaze ray; and/or
a gaze point;
wherein the updating of the cornea model is based on the first eye tracking data and the second eye tracking data.

16. A system for updating a cornea model for a cornea of an eye, the system comprising processing circuitry configured to:
control a display to display a stimulus at a first depth, wherein the display is capable of displaying objects at different depths;
receive first sensor data obtained by an eye tracking sensor while the stimulus is displayed at the first depth by the display;
control the display to display a stimulus at a second depth, wherein the second depth is different than the first depth;
receive second sensor data obtained by the eye tracking sensor while a stimulus is displayed at the second depth by the display; and
update the cornea model based on the first sensor data and the second sensor data.

17. A head-mounted device comprising the system of claim 16 and said display.

18. A non-transitory computer-readable storage medium storing instructions for updating a cornea model for a cornea of an eye, the instructions, when executed by a system, cause the system to:
control a display to display a stimulus at a first depth, wherein the display is capable of displaying objects at different depths;
receive first sensor data obtained by an eye tracking sensor while the stimulus is displayed at the first depth by the display;
control the display to display a stimulus at a second depth, wherein the second depth is different than the first depth;
receive second sensor data obtained by the eye tracking sensor while a stimulus is displayed at the second depth by the display; and
update the cornea model based on the first sensor data and the second sensor data.

* * * * *